United States Patent [19]

Whaley

[11] Patent Number: 4,710,993

[45] Date of Patent: Dec. 8, 1987

[54] DYE COLOR CONTROL SYSTEM

[76] Inventor: Alvin W. Whaley, 2286 Dawnville-Beaverdale Rd., NE., Dalton, Ga. 30720

[21] Appl. No.: 856,965

[22] Filed: Apr. 29, 1986

Related U.S. Application Data

[62] Division of Ser. No. 674,695, Nov. 26, 1984, Pat. No. 4,632,147.

[51] Int. Cl.[4] .................. D06B 23/00; F17D 1/14; F17D 3/01
[52] U.S. Cl. ............................................ 8/158; 137/1
[58] Field of Search ............ 68/207, 205 R; 137/563, 137/597, 606, 1, 3; 8/158

[56] References Cited

U.S. PATENT DOCUMENTS

| | | | |
|---|---|---|---|
| 2,979,066 | 4/1961 | Christie | 137/3 |
| 3,358,706 | 12/1967 | Tischbein | 137/563 X |
| 3,373,762 | 3/1968 | Korchak | 137/606 X |
| 3,387,626 | 6/1968 | Morris et al. | 137/563 |
| 3,905,384 | 9/1975 | Berger | 137/606 X |

FOREIGN PATENT DOCUMENTS 715669  2/1980  U.S.S.R. .................. 8/158

Primary Examiner—Philip R. Coe
Attorney, Agent, or Firm—James B. Middleton

[57] ABSTRACT

A method and apparatus for supplying dyes to a dyeing apparatus, dyes being selected to yield one of a group of colors. A plurality of tanks of dye is provided, and a circuit leads from each tank to a selected one of a pair of valves that may either direct the dye to the dyeing apparatus or direct the dye to be recirculated. The flow through each valve is metered so a particular rate of flow can be established. One group of the valves provides dye to the dyeing apparatus while another group of the valves recirculates dye to establish another color ready to be provided to the dyeing apparatus. The colors are defined in terms of the tanks and rate of flow from the tanks, so a large group of colors can be defined and stored in a computer, and the computer can control valve position and pump speed to control the color produced by the dyeing apparatus.

3 Claims, 3 Drawing Figures

DYE COLOR CONTROL SYSTEM

This application is a division of application Ser. No. 06/674,695, filed Nov. 26, 1984, now U.S. Pat. No. 4,632,147.

INFORMATION DISCLOSURE STATEMENT

It is conventional in the dyeing of textiles and the like to provide a dyeing apparatus wherein concentrated dyes are mixed together and placed into water in the dyeing apparatus. The water dilutes the concentrated dye mixture and applies the diluted mixture to the fabric to be dyed.

While various colors are defined in terms of percentages of each of a plurality of dyes, these mixed colors must usually be prepared in sufficient quantity for any given run since there tend to be variations between dye batches. Also, it will be understood that a given color is placed into the dyeing apparatus; and, to change colors, the system must be washed out to remove all traces of the previous color before a new color is placed into the apparatus. Changing of color is therefore time consuming and severely decreases an overall production rate.

While there are several forms of apparatus for metering two or more liquids to provide a mix, such prior art apparatus has usually been created with the idea that a particular mix would be provided, and the system would be completely purged. Alternatively, the prior art systems have been designed to provide no more than a few different mixes of the components available. There has therefore been no means in the prior art for providing a dyeing mix to a dyeing apparatus in order to achieve a wide range of colors.

SUMMARY OF THE INVENTION

This invention relates to dye mixing for a dyeing apparatus, and is more particularly concerned with a continuous, automated system for providing a predetermined dye mix to achieve a plurality of predetermined colors in a dyeing apparatus.

The present invention provides a plurality of dyes to be mixed in various proportions for producing a wide variety of colors. Means are provided for removing dye from each of a plurality of tanks and measuring the quantity of dye from each tank passing through the system. When two or more dyes are removed from two or more tanks, flow rates of each can be established to achieve the desired final mix.

Since textile dyes must generally be agitated to maintain consistency, the present invention provides for the establishment of the desired flow, and means for continuously circulating the flow when the dye stuff is not actually provided to the dyeing apparatus. This allows the system to be in readiness for substantially immediate feeding to the dyeing apparatus at the appropriate time.

In the preferred form of the invention, electronic data processing means are utilized to store the colors in terms of flow rates of dyes so a given color can be repeated quickly. Using the data processing system, along with the continuous circulating means, one color can be provided to the dyeing apparatus while another color is prepared but circulating continuously and not fed to the dyeing apparatus.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Figures 1, 2:
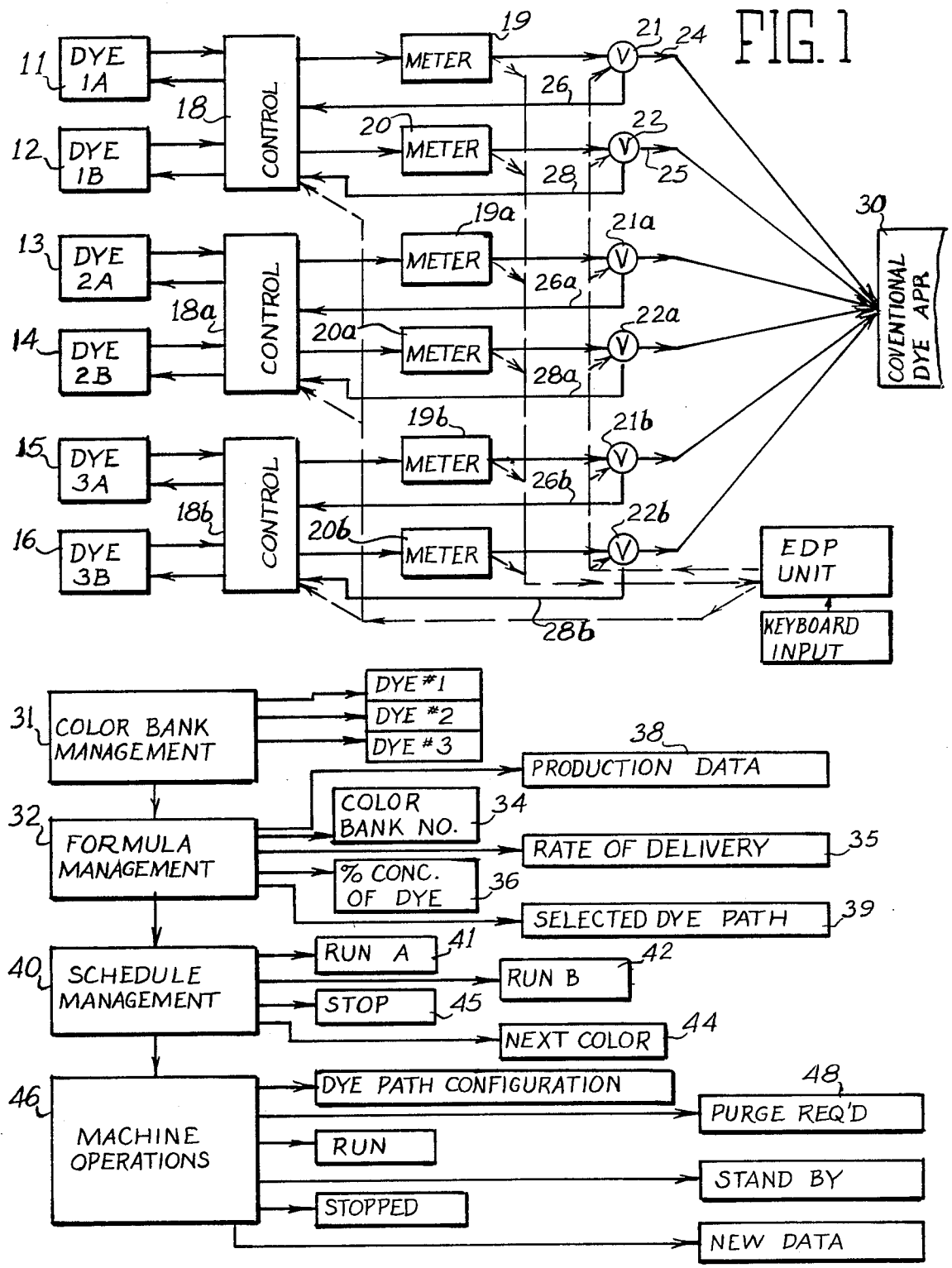
FIG. 1 is a block diagram showing the system of the present invention.
FIG. 2 is a block diagram showing the control arrangement of the electronic data processing system; and, FIG. 3 is a detailed schematic diagram showing a portion of the system illustrated in FIG. 1 of the drawings.

Referring now more particularly to the drawings, and to that embodiment of the invention here presented by way of illustration, it will first be seen that there are six dye tanks designated 11-16. These six tanks are divided into three groupings indicated as 1, 2 and 3. Thus, the tanks 11 and 12 are designated as dye 1A and dye 1B, tanks 13 and 14 are designated as dyes 2A and 2B and tanks 16 and 16 are designated as dyes 3A and 3B. Those skilled in the art will readily recognize that these six tanks, or three groups, can be utilized in many different ways. Also, additional groups may be added for some operations of the system. Nevertheless, by way of illustration, the embodiment here shown will be described as utilizing the three groups and representing the three primary colors of red, yellow and blue. Further, dye number 1 will be referred to as red, and tank 1A will have one dilution of red while tank 1B has a different dilution of red. Using such an arrangement, it will be understood that it will be very easy to produce numerous colors, both light shades and dark shades. Nevertheless, it must be realized that this arrangement is a matter of choice, since the tanks could have darker colors, and a smaller amount of dye could be fed to achieve the same result.

Considering now the dyes 1A and 1B, it will be seen that there is a control designated at 18 which both receives dye from, and returns dye to, each of the tanks 11 and 12. Further, the control 18 delivers dye to meters 19 and 20. From the meters 19 and 20, the dye can pass through valves 21 and 22. The valves 21 and 22 are three-way valves so the material can either pass through the valve into the lines 24 and 25, or the dye can pass through the valves 21 and 22 and into the lines 26 and 28 by which the dye will be returned to the control 18.

From this brief description, it will be understood that dye can be removed from the tanks 11 and 12, metered at 19 and 20, and passed through valves 21 and 22, through the lines 24 and 25 to the conventional dyeing apparatus 30. As will be discussed in more detail hereinafter, the control 18 will control the material from the tanks 11 and 12 separately so material from (for example) tank 11 can be fed through one of the meters 19 or 20, and through one of the valves 21 or 22 to be provided to the dyeing apparatus 30 while dye from the other tank can flow in a closed loop, returning from the valve 21 or 22 through the line 26 or 28 so the proper flow can be established but the dye will not be provided to the dyeing apparatus 30.

The tanks 13 and 14 communicate with a control unit 18a, while the tanks 15 and 16 communicate with a control unit designated at 18b. The three systems are identical, so the description will not be repeated in detail. The same reference numerals are applied to the various parts, with a and b suffixes applied, as with the control unit 18a and 18b.

Looking now at FIG. 2 of the drawings, the operation of the system should be understandable. It will be seen that the dye bank management 31 controls the dyes 1, 2 and 3. It will also be understood that these colors may be subdivided to achieve the complete arrangement shown in FIG. 1, or additional dyes can be added.

The formula management 32 includes the various color formulas stored within the data processing unit. A formula will define a particular color, and it will be understood that this color will be defined in terms of a tank number, with a rate of delivery of the dye from that tank. By defining two or more dyes and their rates of delivery, it will be understood that a given total composition will be defined. Thus, the formula management section 32 will be provided with the dye bank number 34 and the rate of delivery 35. As a quality control means, the system also includes a calculation 36 of the percent concentration of each dye so this can be monitored, and apparatus can be varied to achieve the desired percent concentration.

Also in conjunction with formula management, there will be production data at 38. This is necessary to provide the color numbers in the appropriate order, and at the proper time.

Finally, there is a selected dye path at 39. Remembering the description in conjunction with FIG. 1 of the drawings, a dye from the A tank or B tank can be fed through a meter 19 or 20. Thus, there is one dye path from the tank 11, through the meter 19 and valve 21, and another path from the tank 11 to the meter 20 and valve 22. Similarly, the due from the tank 12 can be fed through either the meter 19 or the meter 20. In the total formula management, the system will now which apparatus is in use, and will select an available dye path.

The schedule management designated at 40 handles the scheduling of the previously described steps. The functions RUN A designated at 41 and RUN B designated at 42 indicate the two colors that can be completely scheduled in the system as previously mentioned. One color can be provided using three of the six valves 21 and 22, and another color can be scheduled using the other valves. Thus, RUN A 41 can be executed using, for example valves 21, 21a and 21b. RUN B 42 can simultaneously be set using valves 22, 22a and 22b with the dyes in all cases being recirculated through the lines 28, 28a and 28b. When RUN A is completed, RUN B can be almost immediately executed while a new RUN A is prepared with a different color.

The next color is prepared through the function 44. A series of colors will be entered into the system, and when the instruction for the next color is given the system will retrieve the particular formula and begin the scheduling including the selection of a particular dye path. There is of course a STOP function designated at 45.

Finally, the machine operations designated at 46 include the selection of the dye path configuration as has been previously mentioned. The purge requirements designated at 48 will be discussed in more detail below, but generally indicates that dyes from two different tanks have become mixed, and the mixture is directed to waste to prevent contamination of the original dyes.

Other conventional operations are the RUN mode, STAND-BY mode, STOPPED mode and NEW DATA mode. These modes are conventional and well understand by those skilled in the art, and no further description is thought to be necessary.

Figure 3:
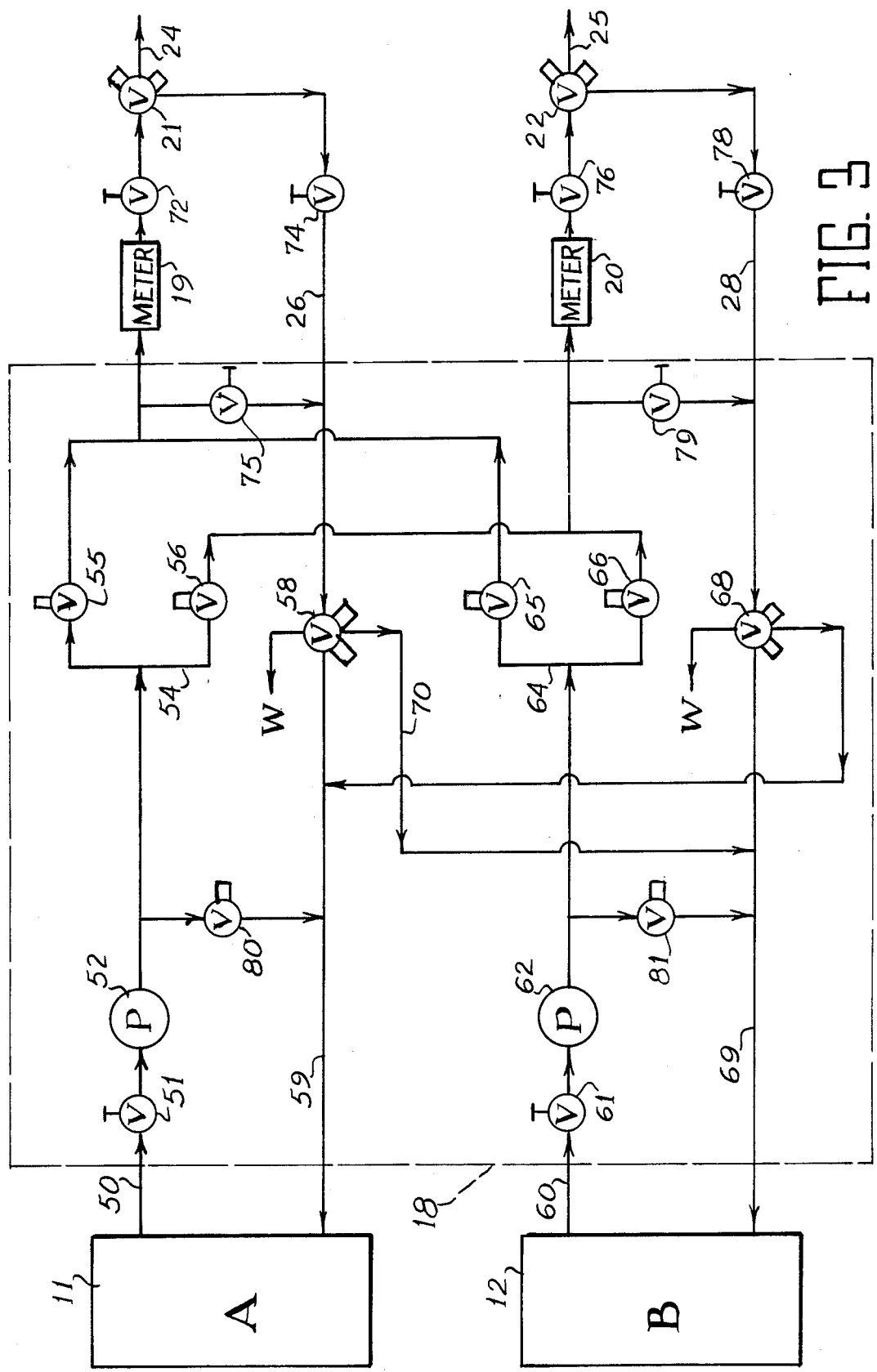

For a detailed understanding of the system of the present invention, attention is directed to FIG. 3 of the drawings. FIG. 3 is a detailed schematic showing the control unit 18 with the tanks 11 and 12, meters 19 and 20 and valves 21 and 22. It will be understood that the other control units would be constructed the same, so a description of this one should suffice.

Considering the arrangement described above, it will be understood that the piping arrangement must allow liquid from the tank 11 to pass through either the meter 19 or the meter 20, and liquid from the tank 12 must be able to pass through either meter 19 or meter 20 and the associated valve. Further, liquid from tank 11, regardless of the path taken, must be returned to the tank 11 and never to the tank 12. The arrangement shown in FIG. 3 allows all these configurations.

Looking at the tank 11, it will be seen that the supply line 50 is directed to a valve 51 which supplies a pump 52. The pump 52 has its output connected to a branch line 54 that includes two valves 55 and 56.

Looking at the tank 12, it will be seen that there is a parallel line including a supply pipe 60, a valve 61 feeding a pump 62, the output of the pump 62 being directed to a branch line 64 including valves 65 and 66.

It will be seen that the output side of the valves 55 and 65 are connected together, and are arranged to feed the meter 19. Similarly, the output sides of the valves 56 and 66 are connected together and are arranged to feed the meter 20. As a result, material fed from the tank 11 through the supply line 50 will pass through the pump 52, and into the branch line 54. At this point, the valve 55 can be opened to allow the material to go to the meter 19, or the valve 56 can be opened to allow the material to go the meter 20. Similarly, material from the tank 12 can pass through the supply line 60 and pump 62, and opening the valve 65 will allow the material to go to the meter 19 while opening the valve 66 will allow the material to go to the meter 20.

The return lines 26 and 28 have been previously mentioned, and it should be noted that the lines 26 and 28 are connected to three-way valves 58 and 68 respectively. The valve 58 can be positioned so that material from the valve 21 will pass completely through the valve 58 and return the material through the line 59 to the tank 11. Simiarly, the valve 68 can be positioned so that material passing through the return line 28 will pass completely through the valve 68 and through the return line 69 to be returned to the tank 12.

Since the valve 21 may be fed from the tank 12, the valve 58 can also be positioned so that liquid returning to the valve 58 from the line 26 will be diverted through the line 70 which is connected to the line 69 to return the material to the tank 12. Similarly, the valve 68 can be placed so that liquid from the return line 28 will be diverted through the line 71 which is connected to the return line 59 to return the material to the tank 11.

One additional setting on the valves 58 and 68 will allow the material returning from the lines 26 and 28 to go to waste, indicated at W. This would be used for a purge, in the event there is contamination in the dye and it is not to be returned to the tank 11 or 12.

Those skilled in the art will realize that the supply of liquid to the conventional dyeing apparatus 30 will vary with the pressure under which the fluid is delivered. In order to maintain the desired pressures at all times, there are several pressure adjusting valves adjacent to the valves 21 and 22. A valve 72 is placed between the meter 19 and the valve 21 to adjust the pressure going to the valve 21. A valve 74 is placed in the return line 26 to adjust the back pressure on the valve 21. Finally, there is a valve 75 connected before the meter 19 and after the valve 74. The valve 75 therefore acts as a bypass to reduce the delivery to the meter 19. Similarly, there are control valves associated with the valve 22. The valve 76 precedes the valve 22, the valve 78 is connected in the return line 28, and the valve 79 is connected as a bypass before the meter 20.

Following the pumps 52 and 62, there is an additional bypass valve labeled 80 and 81. Opening these valves 80 and 81 will allow constant circulation of the liquid in the tanks 11 and 12 to maintain homogeneity even though the tank is not being actively used in the dyeing system.

With the above discussion in mind, it should be understood that a formula is defined in terms of particular dye tanks such as the tanks 11-16. In conjunction with the particular tanks, a flow rate will be set, the flow rate being monitored by the meters such as the meters 19 and 20. The color can be programmed into the system by selecting the particular tanks and the particular meters, and establishing the desired flows, but having the liquid from the final valves such as the valves 21 and 22 simply return the liquid to the tank from whence it came. By this means, the entire system can be checked to assure that all desired flow rates have been established before opening the final valve to deliver the material to the dyeing apparatus. Furthermore, two such colors can be established, one using the valves 21, 21a and 21b while the other uses the valves 22, 22a and 22b.

In operating an overall system, a large number of formulas will be stored in the formula management 32, the storage of a formula including appropriate designations of tanks and flow rates. In scheduling a particular operation, then, a plurality of formulas to be run will be temporarily stored in the schedule management 40. A first color will be set on RUN A 41 and a second color will be set on RUN B 42. When everything is checked and ready for the first color, RUN A 41 will be executed and the appropriate valve such as the valves 21 and 22 will be opened to allow selected quantities of selected dyes to be delivered to the dyeing machine 30. When the quantity of fabric to be dyed has been run through the dyeing apparatus 30, RUN B can be executed, and the color will change almost instantaneously.

At this point, it will be seen that the formula set on the RUN A is no longer needed, so the next color can be called up, and the RUN A section of the apparatus can be reset for the next color to be run. When the fabric for the RUN B is completed, the apparatus will shift to the RUN A mode, again making an almost instantaneous change.

Though the various valves illustrated in the arrangement shown in FIG. 3 can be operated by any desired means, it will be obvious that computer control is highly desirable. In using a computer, the computer will know at all times which valves are open and which are closed, so the computer will know which dye paths are in use, and which are available. This information allows selection of an unused dye path each time a different color is to be set up into the system. This information dye to the tank from whence it came to prevent cross-contamination of dyes.

It will of course be understood by those skilled in the art that the particular embodiment here presented is by way of illustration only, and is meant to be in no way restrictive; therefore, numerous changes and modifications may be made, and the full use of equivalents resorted to, without departing from the spirit or scope of the invention as defined in the appended claims.

What is claimed is:

1. A method for providing a color to a dyeing apparatus wherein said color comprises a mixture of a plurality of dyes, said mixture being provided for use in said dyeing apparatus, said method including the steps of feeding a first dye from a first tank, metering said first dye and establishing a rate of flow of said first dye, feeding a seocnd dye from a second tank, metering said second dye and establishing a rate of flow of said second dye, said rate of flow of said first dye and said rate of flow of said second dye being such as to yield said color when said first dye and said second dye are mixed, and causing said first dye and said second dye to flow to said dyeing apparatus, said method further including the steps of defining a plurality of colors in terms of said tanks and flow rates from said tanks, selecting some of said plurality of colors and establishing a sequence of said some of said plurality of colors, and subsequently carrying out said steps of feeding a first dye and feeding a second dye for providing each color of said some of said plurality of colors in said sequence.

2. A method as claimed in claim 1, and including the steps of feeding a third dye from a third tank, metering said third dye and establishing a rate of flow of said third dye, feeding a fourth dye from a fourth tank, metering said fourth dye and establishing a rate of flow of said fourth dye, said rate of flow of said third dye and said rate of flow of said fourth dye being such as to yield a second color when said third dye and said fourth dye are mixed, and continuously circulating said third dye and said fourth dye at the established rate of flow while said first dye and said second dye flow to said dyeing apparatus.

3. A method as claimed in claim 2, wherein said color and said second color comprise two colors of said some of said plurality of colors, and further including the steps of terminating the flow of said first dye and said second dye to said dyeing apparatus, causing said third dye and said fourth dye to flow to said dyeing apparatus for providing said second color, and establishing flows of dyes for forming the next color in said sequence.

* * * * *